United States Patent
Franks

(10) Patent No.: US 6,257,607 B1
(45) Date of Patent: Jul. 10, 2001

(54) MOUNT FOR CYCLE SHIFT AND BRAKE HANDLES

(76) Inventor: Jon Franks, 360 Sepulveda Blvd. #1030, El Segundo, CA (US) 92045

( * ) Notice: Subject to any disclaimer, the term of this patent is extended or adjusted under 35 U.S.C. 154(b) by 0 days.

(21) Appl. No.: 09/238,000

(22) Filed: Jan. 26, 1999

(51) Int. Cl.[7] .................................................. B62M 1/99
(52) U.S. Cl. ...................................... 280/242.1; 280/249
(58) Field of Search ............................. 280/242.1, 249, 280/250, 282, 288.1

(56) References Cited

U.S. PATENT DOCUMENTS

| | | | |
|---|---|---|---|
| 3,910,599 | * | 10/1975 | Thomas ................................ 280/234 |
| 4,109,927 | * | 8/1978 | Harper ................................. 280/250 |
| 4,152,005 | * | 5/1979 | Vanore ................................. 280/234 |
| 4,270,766 | * | 6/1981 | Thomas ................................ 280/234 |
| 4,303,255 | * | 12/1981 | Thomas ................................ 280/234 |
| 4,685,692 | * | 8/1987 | Fullilove et al. ..................... 280/234 |
| 4,773,662 | * | 9/1988 | Phillips ................................. 280/234 |
| 4,858,942 | * | 8/1989 | Rodriguez ........................... 280/233 |
| 5,082,302 | * | 1/1992 | Nacar .................................. 280/234 |
| 5,383,676 | * | 1/1995 | Valentino ............................. 280/271 |
| 5,464,989 | * | 11/1995 | Grove .................................. 280/250 |
| 5,816,598 | * | 10/1998 | Dodakian ............................ 280/234 |
| 5,853,184 | * | 12/1998 | Lofgren et al. .................... 280/242.1 |
| 5,873,589 | * | 2/1999 | Hallett .............................. 280/250.1 |
| 5,908,199 | * | 6/1999 | Rigato ................................. 280/233 |
| 6,070,894 | * | 6/2000 | Augspurger ......................... 280/249 |

* cited by examiner

Primary Examiner—J. J. Swann
Assistant Examiner—L. Lum

(57) ABSTRACT

A mounting assembly on a hand cycle for the shift and brake handles which includes a collar clamp carried on the end of the front post for detachably connecting with an elongated support member having opposite ends. The clamp member is releasably coupled to the midsection of the support member and the rear-most end of the support member carries a bearing assembly for operably mounting a crank handle with hand pedals. The hand crank further includes sprocket gearing which rotates with the hand crank as the rider turns the hand crank via the hand pedals during a riding procedure.

4 Claims, 2 Drawing Sheets

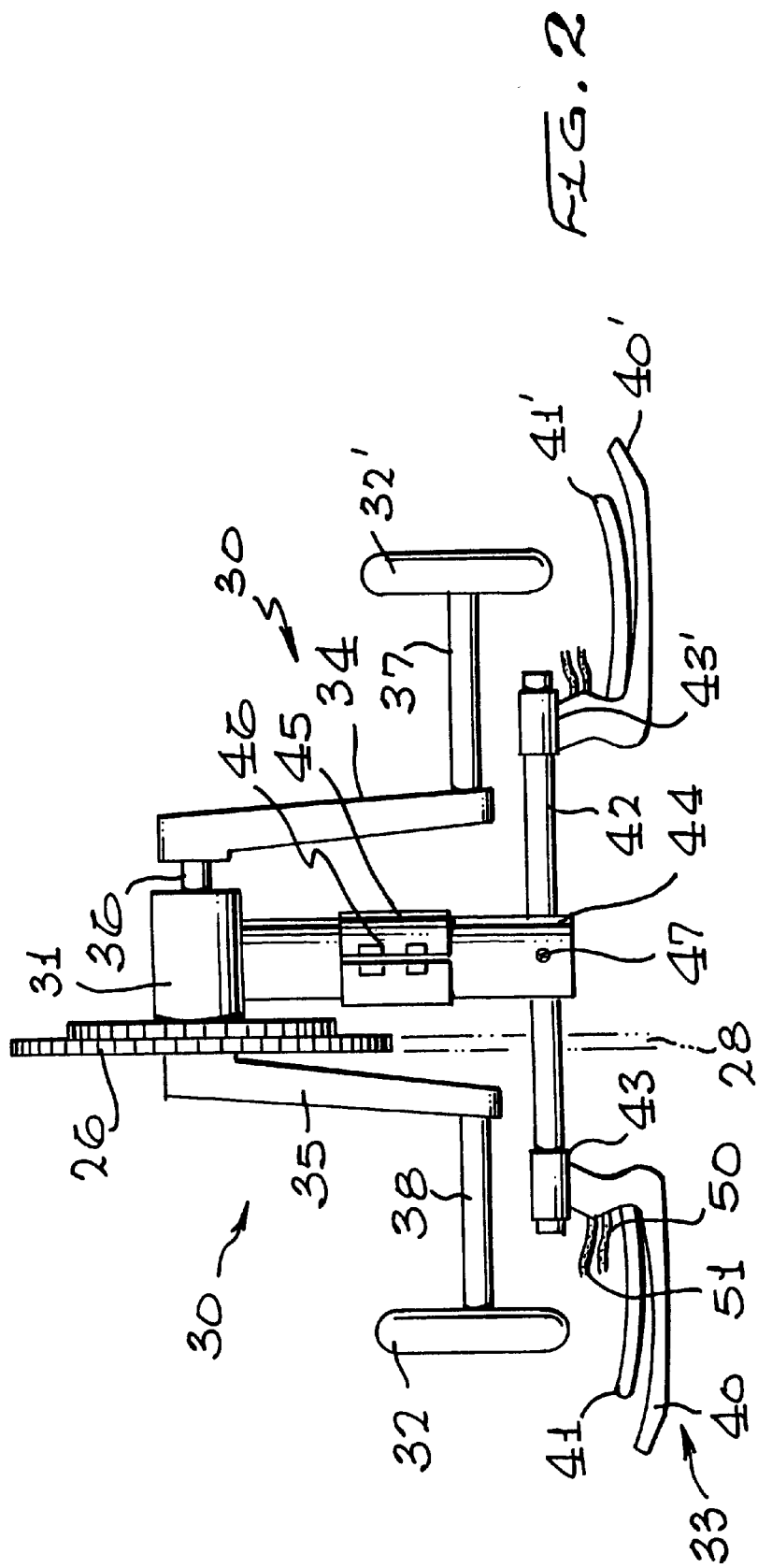

MOUNT FOR CYCLE SHIFT AND BRAKE HANDLES

BACKGROUND OF THE INVENTION

1. Field of the Invention

The present invention relates to the field of hand cycles, and more particularly to a novel mounting means for installing and securing the brake and shift levers on the frame of a hand cycle so that the mounting is in close proximity to the hand-operated pedals or hand grips.

2. Brief Description of the Prior Art

In the past, it has been the conventional practice to mount the hand brake levers and the gear shift levers on the handle bars of a bicycle so that the levers would be available to the rider when his hands are on the handle bars for steering purposes during the riding of the bike. However, in the case of hand cycles, steering is achieved by other means than the turning of a handle bar, such as by change of balance or by employing foot and leg control to achieve steering. In such an instance, the motive power for advancing the cycle resides in hand cranks employed to actuate a gear train generally employing a chain deployed about gearing on the hand crank and the front wheel of the bike. In such an instance, it is highly advantageous to have the brake and shift levers in close proximity to the hand crank so that the user of the bike can readily remove at least one hand from the crank and use one or both hands for braking or shifting purposes. Due to the requirement that the hand crank be in close proximity to the brake and shift levers, proper mounting of the brake and shift levers to the frame of the bike presents certain problems. Some of the problems and difficulties arise from the fact that the frame does not provide a means for mounting conventional handle bars and therefore a special mount is required to place the shift and brake levers in a proper location.

Therefore, a long-standing need has existed in the manufacture and fabrication of hand cycles to provide a proper mounting for the shift and brake levers so that the levers are in a convenient location for use by the driver of the vehicle while employing hand motivation for vehicle advancement.

SUMMARY OF THE INVENTION

Accordingly, the above problems and difficulties are avoided by the present invention which provides a novel mount for a cycle shift and brake handle assembly which includes a frame having a mid support bar with a front post integrally connected at one end and a rear post integrally connected at the other end. The top of the front post terminates in a mounting assembly for the shift and brake handles which include a collar clamp carried on the end of the front post for detachably connecting with an elongated support member having opposite ends. The clamp member is releasably coupled to the midsection of the support member and the rear-most end of the support member carries a bearing assembly for operably mounting a crank handle with hand pedals. The hand crank further includes sprocket gearing which rotates with the hand crank as the rider turns the hand crank via the hand pedals during a riding procedure.

The opposite end of a support member terminates in a mounting tube which is connected at its midsection to the support member. The mounting tube includes mounting sleeves at its respective opposite ends that are cantilevered outwardly from the end of the support tube and each of the mounting sleeves supports a pair of levers constituting the shift and brake levers. Cabling for operating a deraileur mechanism is attached to each of the respective shift levers while the brake mechanism is operably connected to each of the respective brake levers. The collar crank attached to the front post is in close proximity to the hand crank when the support member is mounted on the clamp so that the hand pedals can be rotated about the axis of the bearing assembly and in close position to the shift and brake levers. Therefore, the operator of the cycle can release either one or both of the hand pedals and effectively operate the shift and brake levers as desired.

Therefore, the primary object of the present invention resides in providing a convenient mounting method for combining installation of a bicycle brake and shift system so that a hand-propelled bicycle rider may readily grasp the hand crank as well as optionally or alternately operating the brake and shift levers.

Still a further object of the present invention is to provide a novel means for mounting combined shift and brake levers onto the frame of a hand cycle so that the levers may be installed or removed for maintenance and service purposes as a single unit.

Another object resides in providing a mounting assembly for hand-operated brake and shift levers that are in close proximity to the hand crank for propelling a cycle so that the cycle operator may comfortably alternately grip either the hand crank or the brake and shift levers.

An object also resides in providing a detachable mount for a set of shift and brake levers carried on the frame of a hand cycle.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 2 is an enlarged fragmentary view, in plan view, illustrating the mount for the combined shift and brake levers used on the cycle shown in FIG. 1.

DESCRIPTION OF THE PREFERRED EMBODIMENT

Figure 1:
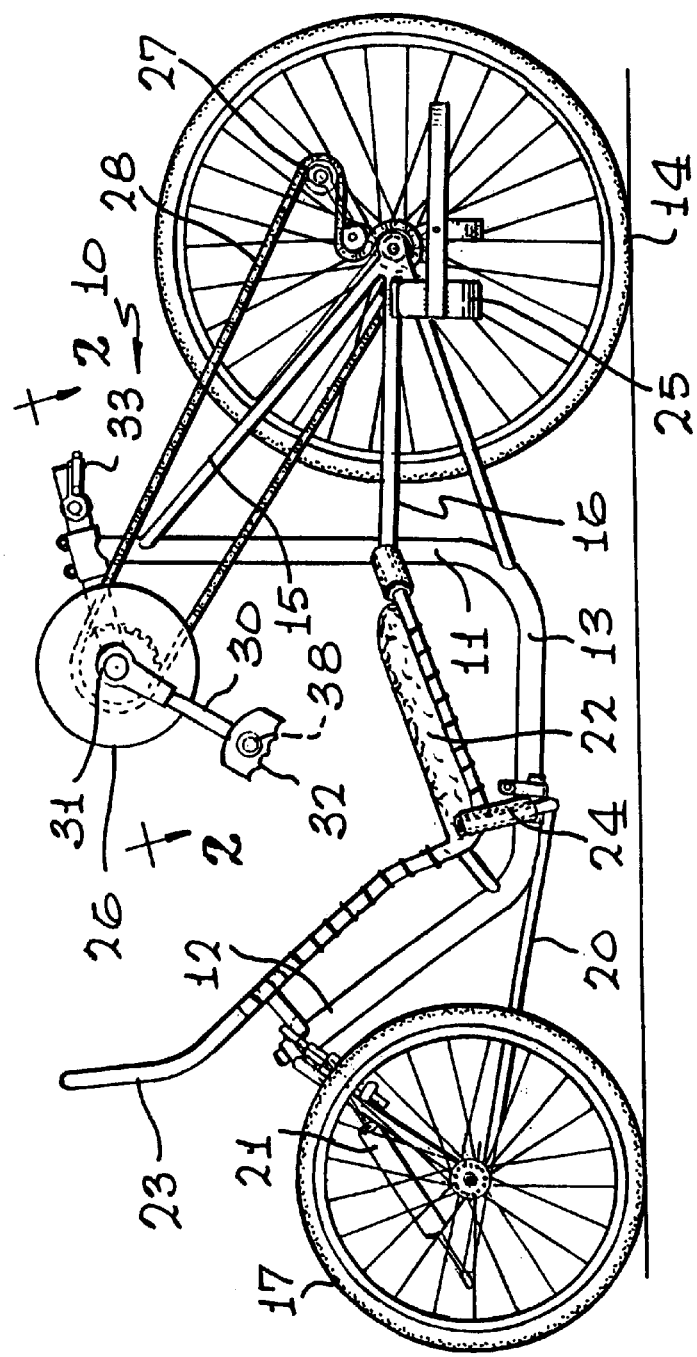
FIG. 1 is a side elevational view showing a hand cycle incorporating the combined mount for a shift and brake system.

Referring to FIG. 1, the novel mount for a cycle shift and brake handle assembly is indicated in the general direction of arrow 10 and the assembly is mounted on a frame having a front post 11 and a rear post 12 joined together by a mid support bar 13. The front post 11 supports a front wheel 14 by means of braces 15 and 16 and a rear wheel 17 is supported from the rear post by the struts 20 and a damper assembly 21. A seat 22 is carried between the front and rear posts of the frame which includes a back 23 and handle grips 24 are employed on either side of the seat for optional use by the operator. Leg supports 25 are included on each side of the front wheel 14 so that the operator's legs may be supported therein. A typical hand cycle is further disclosed in co-pending U.S. application for Letters Patent having Ser. No. 08-909,118, filed Aug. 11, 1997.

The hand cycle further includes a driving mechanism comprising a sprocket gear set 26 connected to a deraileur system 27 by means of a chain 28. The sprocket set 26 is driven by a hand crank 30 wherein a pair of arms is disposed on opposite ends of a shaft passing through a bearing assembly 31. The terminating end of each arm of the crank includes a pivoting hand grip 32.

The upper end of the front post 11 of the frame includes a mount or bracket assembly for supporting shift and brake levers. The levers are broadly identified by numeral 33 and will be described further.

Referring now in detail to FIG. 2, it can be seen that the crank assembly 30 includes arms 34 and 35 that are connected together by a shaft 36 which passes through the bearing assembly 31. The opposite ends of the respective crank arms 34 and 35 terminate in rods 37 and 38 respectively wherein each end of the rod carries a revolving hand grip 32 and 32' respectively. The shift and brake assembly 33 includes a brake lever 40 and a shift lever 41 associated with each end of a mounting tube 42. Each of the respective shift and brake lever assemblies are coupled to the opposite ends of the mounting tube 42 by means of a sleeve 43 and 43' respectively.

A support member 44 is secured to the topmost end of the front post 11 by means of a clamp collar 45 which is secured by means of fasteners 46. The clamp 45 fixedly secures to the midsection of support member 44 and the rearmost end of the support member is attached to the housing for the bearing assembly 31 while the opposite end is attached to the midsection of the mounting tube 42 by means of a fastener 47.

It can be seen that the rods 37 and 38 of the crank assembly 30 lie on the same axes and that as the crank assembly is rotated on the bearing assembly 31, the hand grips 32 and 32' come in close proximity to the shift and brake levers 40 and 41. Therefore, should the operator elect to release his grip on the hand grips 32 and/or 32', he may then reach to the shift and brake lever assemblies 40 or 40' to operate the deraileur 27 and/or the brakes. The levers are coupled to the respective deraileur and brakes by means of cables, such as indicated by numerals 50 and 51 respectively.

Therefore, it can be seen that by employing the mounting, means for the cycle shift and brake levers that incorporate the present invention, the operator will have better control over braking and shifting while he is operating and steering the hand cycle. The inventive assembly includes the clamp 45 secured to the top of the front frame post 11 so as to support the crank assembly from the rearmost end of the support member 44 by means of the bearing assembly 31. The opposite end of the support member 44 is fastened by fastener 47 to the midsection of the mounting tube 42 so that the sleeves 43 and 43' may secure the shift and brake levers to the opposite ends of the mounting tube.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A mount for a cycle shift and brake handle assembly comprising:

a frame having a front post;

a support member having a midsection between a rear end and a forward end;

said support member midsection releasably secured to said front post;

a bearing assembly carried on said rear end of said support member;

a mounting tube secured to said front post of said support member;

gear shift and brake levers operably carried on said mounting tube; and a driving hand crank mechanism rotatably mounted on said bearing assembly and having hand grips rotatable about a turning axis of said bearing assembly wherein said turning axis is in close spaced apart relationship with respect to said gear shift and brake levers.

2. The cycle shift and brake handle assembly as defined in claim 1 wherein:

said driving hand crank mechanism includes:

a pair of hand grips rotatably mounted on a pair of cranks rotatably carried on said bearing assembly; and said pair of hand grips lying on a common axis parallel with said mounting tube so that said pair of hand grips are in close proximity to said gear shift and brake levers.

3. The cycle shift and brake handle assembly as defined in claim 2 including:

a front wheel rollably supported on said front post; and a sprocket and chain drive mechanism carried on said bearing assembly with said pair of cranks for transferring driving power from said pair of hand grips to said front wheel.

4. The cycle shift and brake handle assembly as defined in claim 3 wherein:

a sprocket of said sprocket and chain mechanism resides rearward of said front post and said front wheel resides forward of said front post and a chain of said sprocket and chain mechanism operatively interconnects said pair of cranks to said front wheel for providing drive power thereto.

* * * * *